Oct. 31, 1933.     A. G. FORSYTH     1,933,423
IGNITION SYSTEM OF INTERNAL COMBUSTION ENGINES
Filed April 13, 1933     2 Sheets-Sheet 1
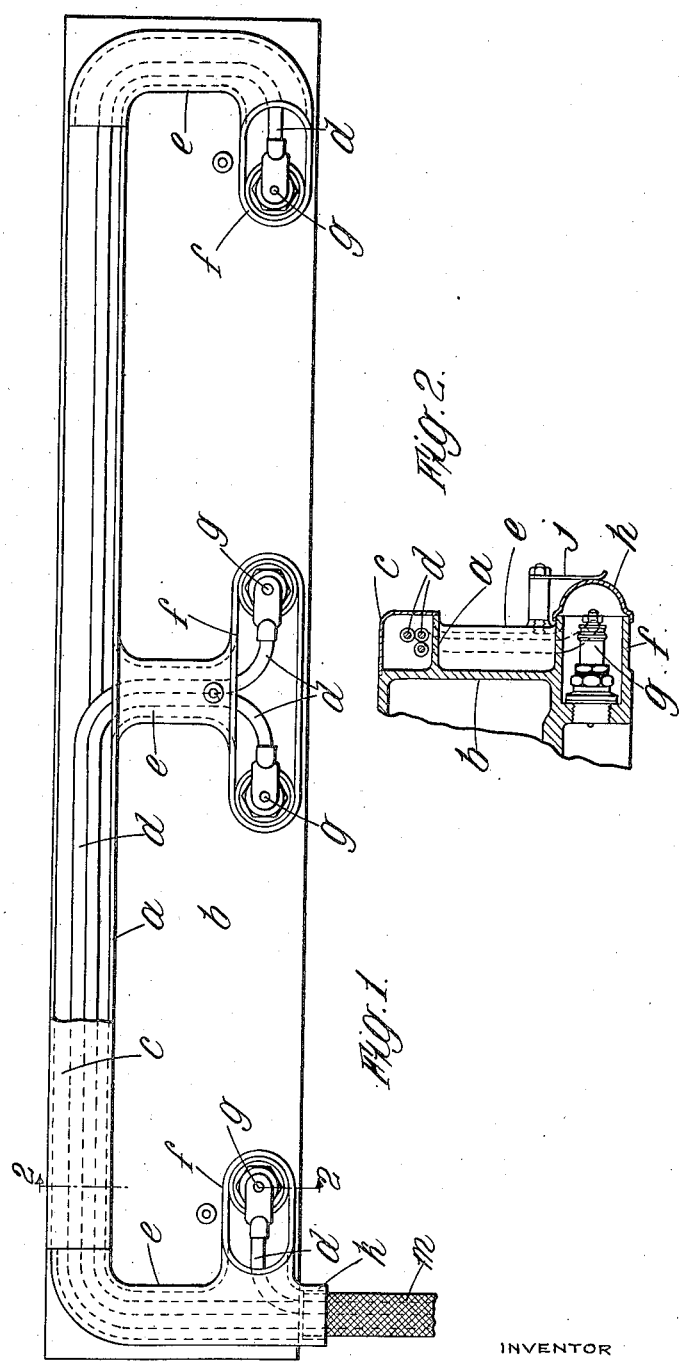
INVENTOR
Archibald Graham Forsyth
BY
ATTORNEY

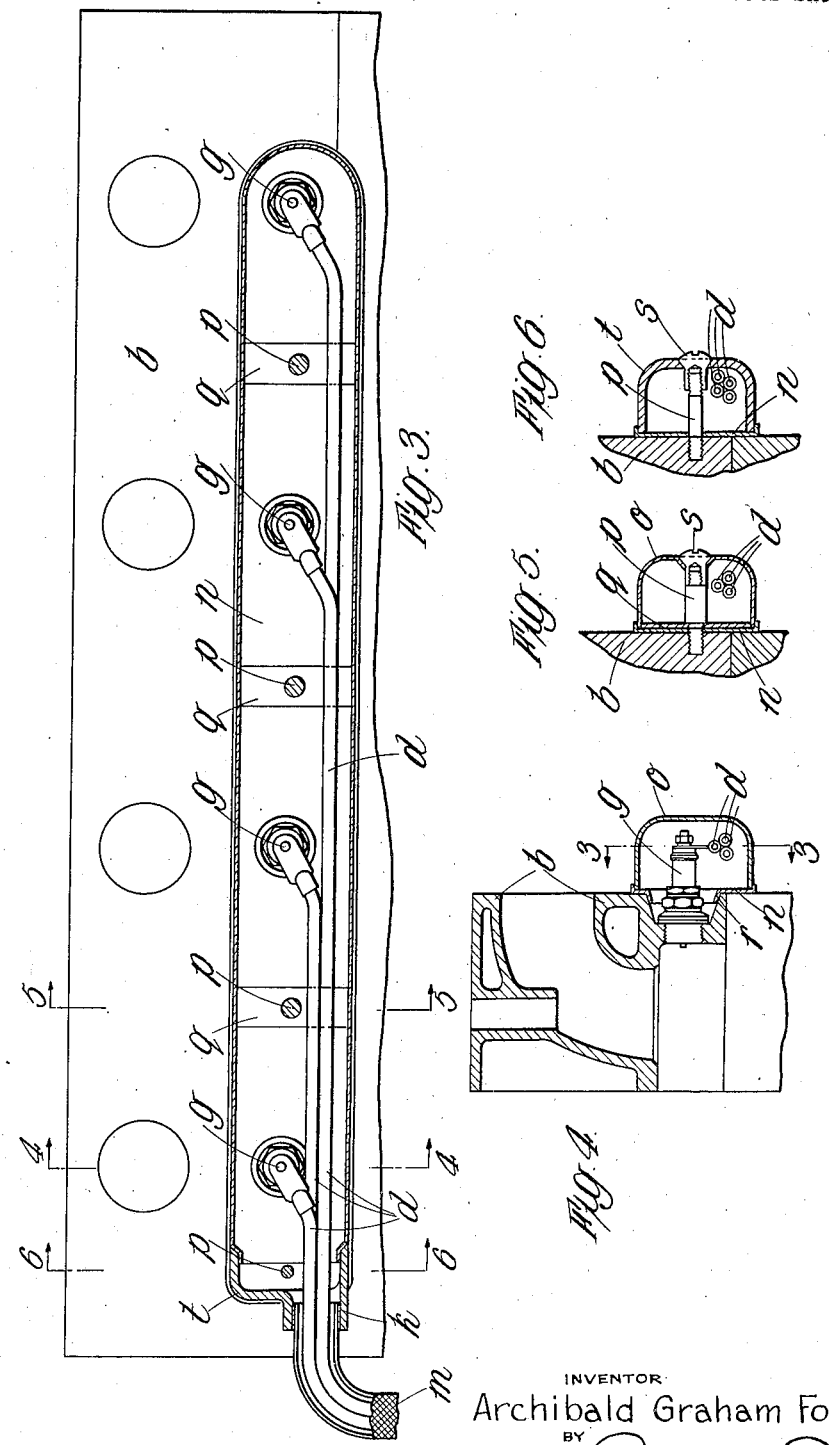

Patented Oct. 31, 1933

1,933,423

UNITED STATES PATENT OFFICE 1,933,423

IGNITION SYSTEM OF INTERNAL COMBUSTION ENGINES

Archibald Graham Forsyth, Cheam, England, assignor to The Fairey Aviation Company Limited, Hayes, England Application April 13, 1933, Serial No. 666,054, and in Great Britain June 8, 1932

7 Claims. (Cl. 123—148)

This invention relates to the ignition system of an internal combustion engine, especially an aircraft engine, and has for its object to prevent interference by the current flowing in said system with the reception of signals by short wave length wireless telephonic apparatus on the aircraft or the like.

To this end the high tension cables of the ignition system of an internal combustion engine and the external parts of the sparking plugs of said engine, are enclosed entirely by a metal screen.

For this purpose channels may be formed integrally with the cylinder casting and provided with suitable detachable metal coverplates, said channels being of such size and disposition as to accommodate the high tension cables and surround the external parts of the sparking plugs, or alternatively the conduits may be formed by complementary metal members one of which is secured to the engine whilst the other constitutes a channel and coverplate combined.

It is to be understood that those parts of the high tension cables which lead from the conduits to the magneto or distributor are screened by flexible metallic tubing which constitutes a continuation of the conduits.

Examples of the invention are shown in the accompanying drawings of which Figure 1 is a partial side elevation, parts being omitted for the sake of clearness and Figure 2 is a fragmentary section on the line 2—2, Figure 1; whilst Figure 3 is a sectional side elevation, on the line 3—3, Figure 4, of a modification and Figures 4, 5 and 6 are sections on the lines 4—4, 5—5, and 6—6, respectively, Figure 1, Figures 5 and 6 being fragmentary only.

Figures 1 and 2 show a fin $a$ formed integrally with the cylinder head $b$ of an internal combustion engine said fin $a$ running alongside and at a short distance from one edge thereof as shown in Figure 2 so that said fin and part of the head constitute two walls of a substantially rectangular conduit the two other walls of which are constituted by a L-section metal coverplate $c$ adapted to be secured in position after the cables $d$ . . . have been located. The conduit so formed communicates with ducts $e$ . . . formed integrally with the cylinder head $b$ and leading to the sparking plug positions which are surrounded by outstanding integral walls $f$ . . . adapted to surround the external parts of the sparking plugs $g$ . . . and provided with removable metal coverplates such as $h$ (Figure 2), held in position by a spring finger such as $j$. One of the walls $f$ is arranged as at $k$, Figure 1 for the connection therewith of flexible metal tubing $m$ for screening those parts of the cable which lead to the magneto or distributor (not shown) with which said tubing $m$ is connected in a similar manner.

In some cases the fin $a$ and coverplate $c$ may be so formed as to constitute a conduit leading directly into the chambers presented by the walls $f$ . . . thus obviating the ducts $e$ . . ., whilst said fin and coverplate may even be so formed as to obviate the walls $f$ . . . also.

According to the modifications of this invention shown in Figures 3, 4, 5 and 6, the conduits are formed from a metal member $n$ of flat U-section adapted to be secured to the cylinder head $b$ and a domed metal coverplate $o$. The flat U-section member $n$ is secured to the cylinder head $b$ by shouldered studs $p$ . . . passing through clamping plates $q$ . . . and through the web of said member $n$ and serving also for the attachment of the coverplate $o$ and, corresponding with the sparking plug positions, said member $n$ is apertured to give passage to the external parts of the plugs $g$ . . . and is pressed out marginally as at $r$, Figure 4, to fit snugly in the usual depressions in the casting at those parts. The domed coverplate $o$ fits closely within the limbs of the flat U-section member $n$ and is secured by sleeve nuts such as $s$, Figure 5, passing through marginally depressed apertures in said coverplate $o$ and engaging the studs $p$. At one end the domed coverplate $o$ closes the conduit as shown at the right hand end, Figure 3, whilst at the other end it fits within a metal end piece $t$ which seats on the flat U-section member $n$ (see Figure 6) and is secured to the cylinder head $b$ by one of the studs $p$ . . . which secure said member $n$. This end piece $t$ is formed with a sleeve $k$ to receive the adjacent end of a length of flexible metallic tubing $m$ through which the cables $d$ . . . the led from the magneto (not shown).

In both forms of the invention the high tension cables and sparking plugs are enclosed entirely by an effective metal screen, whilst the detachable coverplates enable ready access to the cables and plugs to be obtained when required.

I claim:—

1. In an ignition system for an internal combustion engine having a source of high tension electric current supply, and a cylinder casting, channels formed in said casting, sparking plugs, parts of which are external of said engine, high tension cables connecting said source and plugs, and metal coverplates detachably secured over said channels, said channels and coverplates being adapted to enclose said high tension cables and the external parts of said plugs.

2. In an ignition system for an internal combustion engine having a source of high tension current supply, sparking plugs, parts of which are external of said engine, high tension cables connecting said source and plugs, a cylinder casting, metal members on said casting, complementary channel shaped metal members detachably secured to said casting, and adapted to enclose said high tension cables and the external parts of said plugs.

3. In an ignition system for an internal combustion engine having a source of high tension electric current supply, a cylinder casting, a metal fin adjacent one edge of said casting, sparking plugs, parts of which are external of said engine, high tension cables connecting said source and plugs, an L section metal coverplate secured to said fin and casting and adapted with said fin and casting to enclose said high tension cables, metal ducts at right angles to and adjacent said fin, and metal screens enclosing said plugs.

4. In an ignition system for an internal combustion engine having a source of high tension electric current supply, a cylinder casting, a metal fin adjacent the edge of said casting, sparking plugs, parts of which are external of said engine, high tension cables connecting said source and plugs, an L section metal coverplate secured to said fin and casting and adapted with said fin and casting to enclose said high tension cables, tubular metal ducts at right angles to and adjacent said fin, and metal screens enclosing said plugs.

5. In an ignition system for an internal combustion engine having a source of high tension electric current supply, a cylinder casting, a metal fin adjacent the edge of said casting, sparking plugs, parts of which are external of said engine, high tension cables connecting said source and plugs, an L section metal coverplate secured to said fin and casting and adapted with said fin and casting to enclose said high tension cables, metal ducts at right angles to and adjacent said fin, upstanding walls on said casting surrounding the external parts of said plugs and metal coverplates detachably secured to said walls.

6. In an ignition system for an internal combustion engine having a source of high tension electric current supply, sparking plugs, parts of which are external of said engine, high tension cables connecting said source and plugs, a cylinder casting, U section metal members on said casting, said members being apertured and pressed out marginally at the plug positions, and complementary dome section coverplates, detachably secured to said members.

7. In an ignition system of an internal combustion engine having a source of high tension electric current supply, sparking plugs, parts of which are external of said engine, high tension cables connecting said source and plugs, a cylinder casting, metal members on said casting, a metal end piece formed with a sleeve and secured to said members and complementary coverplates detachably secured to said members and fitting into said end pieces.

ARCHIBALD GRAHAM FORSYTH.